R. R. HAGE.
RESILIENT WHEEL.
APPLICATION FILED JULY 21, 1910.

986,563.  Patented Mar. 14, 1911.

Witnesses:
E. C. Skinkle
Harry Opsahl

Inventor:
Robert R. Hage
By his Attorneys:
Williamson Merchant

UNITED STATES PATENT OFFICE.

ROBERT R. HAGE, OF CULBERTSON, MONTANA.

RESILIENT WHEEL.

986,563.  Specification of Letters Patent.  Patented Mar. 14, 1911.

Application filed July 21, 1910. Serial No. 573,029.

*To all whom it may concern:*

Be it known that I, ROBERT R. HAGE, citizen of the United States, residing at Culbertson, in the county of Valley and State of Montana, have invented certain new and useful Improvements in Resilient Wheels; and I do hereby declare the following to be a full, clear, and exact description of the invention, such as will enable others skilled in the art to which it appertains to make and use the same.

My invention has for its object to provide a simple and highly efficient resilient wheel adapted for general use on vehicles, but especially adapted for automobile service.

To the above end my invention consists of the novel devices and combination of devices hereinafter described and defined in the claims.

In the accompanying drawings, which illustrate the invention, like characters indicate like parts throughout the several views.

Figure 1:
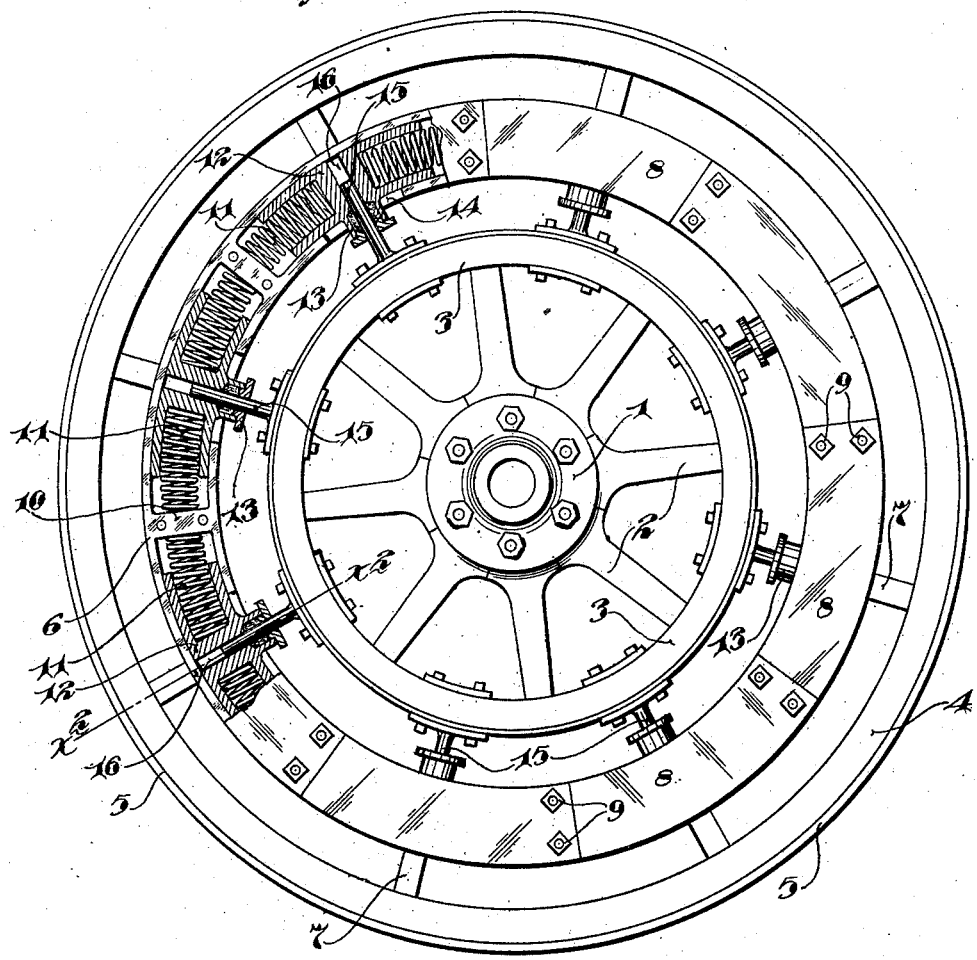
Figure 2:
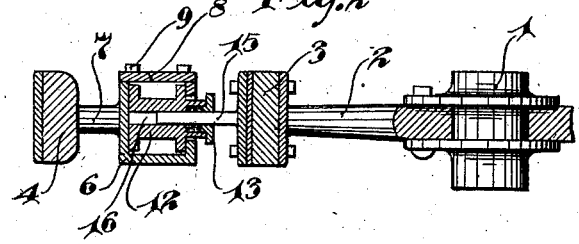

Referring to the drawings: Figure 1 is a view in side elevation with some parts broken away and some parts sectioned showing my improved wheel, and Fig. 2 is a view principally in section, taken partly on the line $x^2\ x^2$ of Fig. 1, partly centrally through the hub of the wheel and with some parts broken away.

The improved wheel comprises two concentric wheel members which in themselves are rigid but are yieldingly connected through spring devices of novel construction and arrangement. The inner or hub member of the wheel comprises a hub proper 1, short spokes 2 and inner rim 3, which parts as already indicated are rigidly connected. The outer wheel member comprises a tread rim made up of a felly 4 and tire 5, and an annular metallic spring box 6 shown as rigidly connected to the said felly but spaced concentrically therefrom by short spacing blocks of stub spokes 7. One side plate of the spring box 6 is detachable and is preferably made up of segmental sections 8 secured thereto by nutted bolts 9 passed therethrough and through radial, circumferentially spaced partitions 10 rigidly secured in the said spring box, midway between the spacing blocks 7. These partitions 10 afford abutments for opposing coiled springs 11 which are arranged in pairs and yieldingly hold in center or intermediate positions, segmental sections or friction blocks 12 that closely fit within the segmental spring box 6 and are mounted for limited oscillatory movements therein circumferentially of the wheel. These friction blocks 12 are preferably recessed to receive the ends of the opposing spring 11, and also provided with centrally located inwardly projecting stuffing boxes 13 that project through segmental slots 14 formed in the inner wall of the spring box 6. Rigidly secured to the inner rim 3 of the hub section of the wheel are outwardly projecting plungers 15 that work through the stuffing boxes 13 of the friction blocks 12 and through perforations 16 of the said blocks. The packing contained in the stuffing boxes 13 is preferably saturated with oil so that it will keep the plungers 15 well lubricated.

As is evident, the combined action of the springs 11 serve normally to hold the axis of the wheel hub 1 coincident with the axis of the periphery or tread of the wheel. Any movement of the hub in respect to the wheel rim or vice versa can take place only by producing movements of all of the friction blocks 12, except those which happen to stand exactly at the top or exactly at the bottom of the wheel, and hence nearly all of the springs are at all times rendered effective to give resilience to the wheel. Any movement of the inner wheel member in respect to the outer wheel member will also cause sliding movements of the friction blocks 12 within the spring box 6 and hence a frictional resistance is caused to co-act with the springs to resist shocks produced in the wheel. In fact, the friction devices act as spring dampeners or spring retarding devices, which serve to prevent the springs from being too sensitive and from causing a tremble or continued vibration of the wheel.

The resilient wheel described even where used on an automobile will be efficient without the use either of pneumatic or of the cushioned rubber tires. It will not only relieve the body of the automobile from jars incident to travel over the road, but will relieve the motor and machinery generally from jars in starting and in changing speed.

What I claim is:

1. A resilient wheel comprising inner and outer members, one thereof having circumferentially extended seats and friction blocks therein and the other having radial plungers working in said friction blocks and which friction blocks have frictional engagement at their outer convex faces with the outer member of said wheel, substantially as described.

2. In a resilient wheel, the combination with inner and outer concentric wheel members, of an annular spring box rigidly secured to said outer wheel member and having approximately radial partitions, friction blocks mounted in said spring box between said partitions, opposing coiled springs compressed between said friction blocks and partitions, said friction blocks having inwardly projecting stuffing boxes adapted to contain lubricating material, plungers rigidly secured to the inner wheel member, projecting radially outward therefrom and working radially through the stuffing boxes and into radial seats of the said friction blocks, substantially as described.

In testimony whereof I affix my signature in presence of two witnesses.

ROBERT R. HAGE.

Witnesses:
J. E. PETERSON,
J. O. SLETTE.

Copies of this patent may be obtained for five cents each, by addressing the "Commissioner of Patents, Washington, D. C."